United States Patent [19]

Kondo

[11] Patent Number: 4,706,126
[45] Date of Patent: Nov. 10, 1987

[54] FACSIMILE APPARATUS

[75] Inventor: Mitsuru Kondo, Sagamihara, Japan

[73] Assignee: Ricoh Company. Ltd., Tokyo, Japan

[21] Appl. No.: 790,127

[22] Filed: Oct. 22, 1985

[30] Foreign Application Priority Data

Nov. 2, 1984 [JP] Japan ............................ 59-230085
Nov. 2, 1984 [JP] Japan ............................ 59-230086
Dec. 6, 1984 [JP] Japan ............................ 59-256507

[51] Int. Cl.⁴ .................... H04N 1/32; H04N 1/40; H04N 1/41
[52] U.S. Cl. .................... 358/257; 358/256; 358/260; 358/280
[58] Field of Search ............... 358/256, 280, 260, 261, 358/257

[56] References Cited

U.S. PATENT DOCUMENTS

| 4,491,873 | 1/1985 | Takayama | 358/260 |
| 4,586,086 | 4/1986 | Ohzeki | 358/256 |
| 4,587,633 | 5/1986 | Wang | 358/256 |
| 4,593,323 | 6/1986 | Kanda | 358/256 |

Primary Examiner—Howard W. Britton
Attorney, Agent, or Firm—Oblon, Fisher, Spivak, McClelland & Maier

[57] ABSTRACT

A high speed, high performance facsimile apparatus having an image data storing function is disclosed. In the apparatus, coders, decoder and other structural elements are connected to a system bus. Delivery of instructions from a processing unit to the various structural elements in the system, return of responses from the structural elements to the processing unit, and exchange of image data between the structural elements are effected over the system bus, so that a single processing unit executes both the control and the input and output of image data.

9 Claims, 4 Drawing Figures

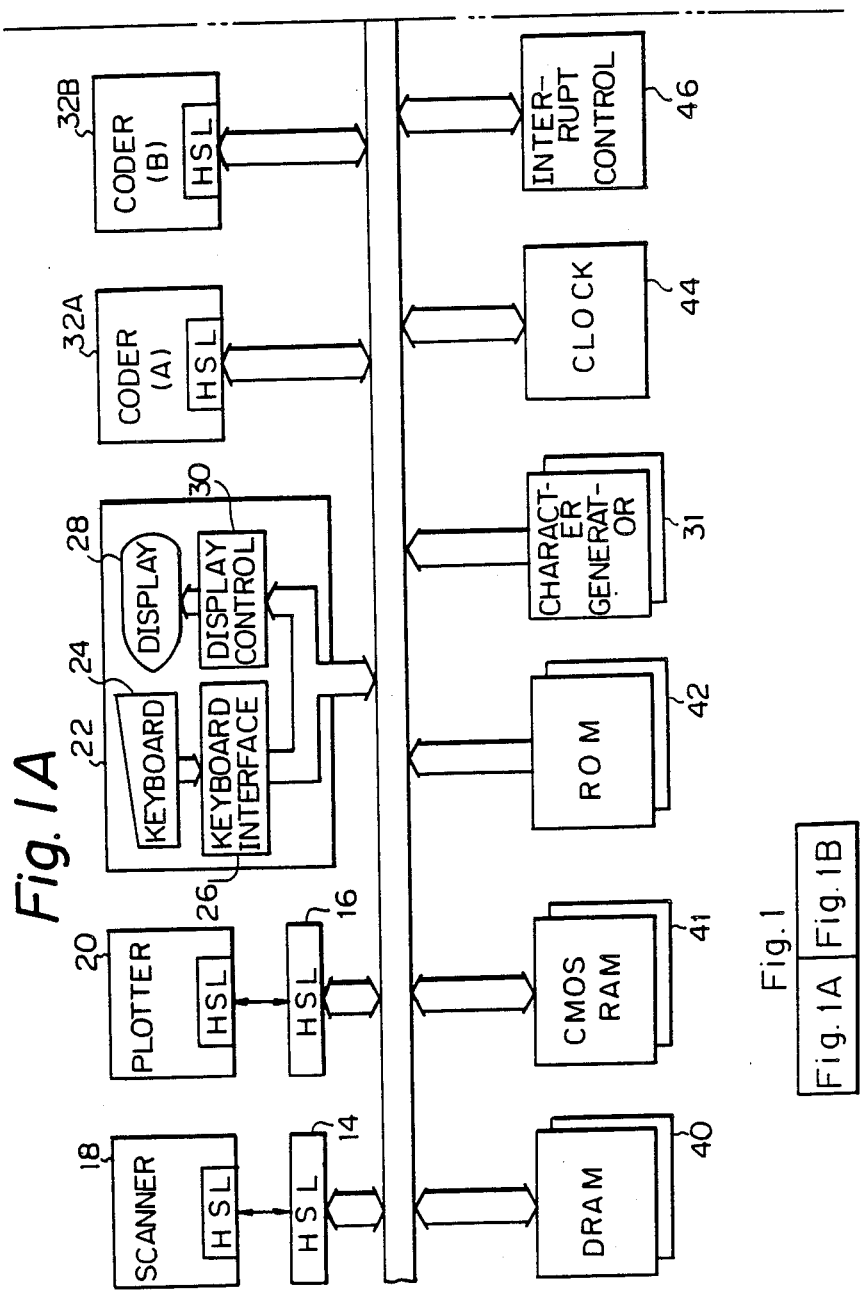

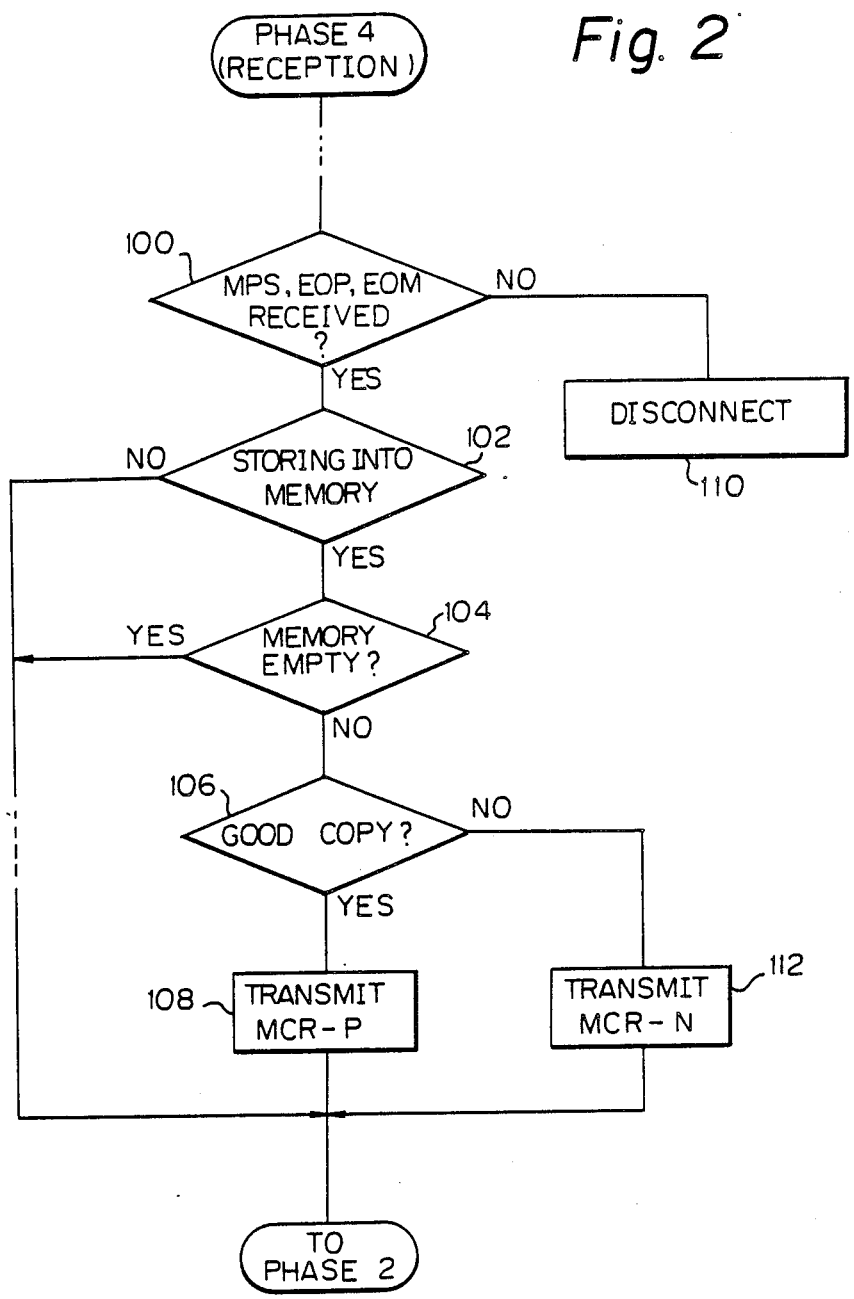

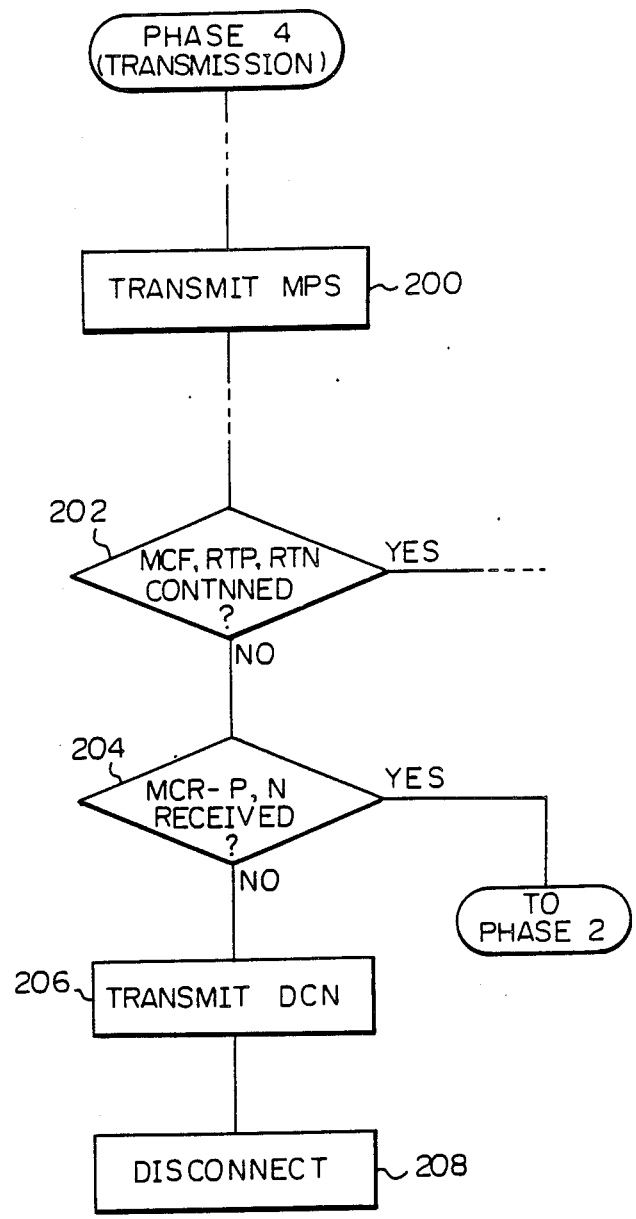

FACSIMILE APPARATUS

BACKGROUND OF THE INVENTION

The present invention relates to a high speed, high performance facsimile apparatus which has an image data storing function.

Prior art facsimile systems have generally been constructed with either one of two different designs, one directed toward cutting down cost and size and the other toward enhancing speed and performance. A low cost, small size facsimile apparatus is usually provided with a single processing unit (microprocessor) which executes various kinds of control and processing including compression and restoration of image data, sequence control, exchange of data through input/output ports, exchange of image data through an image recorder (plotter) and an image reader (scanner), communication protocol control, and operator interface control. A high-speed and high-performance apparatus, on the other hand, is provided with a plotter, a scanner, a data compression/restoration unit and a communication control unit which are constructed separately from each other. All these independent units are controlled by a processing unit, while input and output image data are processed and transferred by another hardware without the intermediary of the processing unit. For example, concerning the sequence control over various structural elements of a facsimile apparatus, it is executed by a processing unit and the transfer of image data between the elements is implemented with an exclusive high-speed transfer bus or with hardware which interconnects the elements, in the latter case the bus connection to the processing uniti being omitted. Such makes the overall construction of the apparatus complicated and bulky. In an apparatus using a certain prior art system, input and output of image data to and from a data compression/restoration unit is accomplished using a hardware interface and, therefore, definitely determined in configuration at the stage of hardware design, thus lacking flexibility in meeting a particular application. That is, with such an apparatus, it is impossible to flexibly change the sequence and frequency of image data transfer between the structural elements for matching them to a particular system application. Stated another way, it is difficult to use the apparatus for multiple purposes and, therefore, the system lacks vertatility.

Meanwhile, a type of high-speed, high-performance facsimile system known in the art is furnished with a store and forward (SAF) function for storing and then transmitting image data. In the event of reception of image data, the SAF type facsimile apparatus temporarily stores received image data in an image data store area and allows them to be outputted as a hard copy afterwards through a recorder. Generally, facsimile communications are set up based on any of communication systems which are described in CCITT Recommendations, e.g. GIII communication system. While a facsimile apparatus operates as a receiving station, it sends a digital identification signal (DIS) back to a transmitting station as an initial identification signal. As well known in the art, the signal DSI serves to inform the transmitting station of the performance particular to the receiving station, the performance including the minimum transmission time specific to the transmitting station. The minimum transmission time is defined as a transmission time necessary for transmitting one scanning line of image data.

A prior art facsimile apparatus, even if provided with the SAF function, has customarily been designed to inform a transmitting station of a hard copy outputting rate of its recorder as the minimum transmission time. This gives rise to a problem that since the outputting rate of a recorder in general is far slower than the writing rate of a memory and, therefore, it is quite probable that the store area for the temporary storage of received image data becomes partly emptied, the reception of image data is restricted by the slow output rate of the recorder. Such has obstructed fast and efficient transmission of image data.

SUMMARY OF THE INVENTION

It is therefore a first object of the present invention to provide a facsimile apparatus which is versatile in system application, small size, high speed, and excellent in performance.

It is a second object of the present invention to provide a facsimile communication system which is capable of transmitting image data within a short period of time.

It is another object of the present invention to provide a generally improved facsimile apparatus.

In one aspect of the present invention, there is provided a facsimile apparatus comprising a processor, a bus connected to the processor, a store connected to the bus for temporarily storing image data, an image data input device connected to the bus for inputting visible images as image data, a communication control connected to the bus for transmitting and receiving image data to and from a communication line, coders connected to the bus for compressing the inputted image data, a decoder connected to the bus for restoring the received image data to original image data, and an image data output device connected to the bus for outputting the restored image data as visible images.

In another aspect of the present invention, there is provided a facsimile apparatus comprising a processor, a bus connected to the processor means, a store connected to the bus for temporarily storing image data, an image data input device connected to the bus for inputting visible images as image data, a communication control connected to the bus for transmitting and receiving image data to and from a communication line, coders connected to the bus for compressing the inputted image data, a decoder connected to the bus for restoring the received image data to original image data, and an image data output device connected to the bus for outputting the restored image data as visible images. The processor is constructed to apply instructions to the store, the image data input device, communication control, coders, decoder and image data output device over the bus, and control the image data input device, communication control, coders, decoder and image data output means upon reception of responses from those units, whereby image data inputted by the input device are transmitted to the communication line as compressed image data, while image data received over the communication line are outputted by the output device. The bus is constructed to cause image data to be transferred between the processor, store, image data input device, communication control, coders, decoder, and image data output device.

In another aspect of the present invention, there is provided a facsimile apparatus comprising a processor, a bus connected to the processor, a store connected to the bus for temporarily storing image data, an image data input device connected to the bus for inputting visible images as image data, a communication control connected to the bus for transmitting and receiving image data to and from a communication line, coders connected to the bus for compressing the inputted image data, a decoder connected to the bus for restoring the received image data to original image data, and an image data output device connected to the bus for outputting the decoded image data as visible images. The coder is constructed to compress image data inputted by the image data input device or image data stored in the store without being compressed, the compressed image data being stored in the store or transferred to the communication control to be transmitted. The decoder is constructed to restore image data which are received by the communication control or image data which are stored in the store without being restored to original image data.

In another aspect of the present invention, there is provided a facsimile apparatus comprising a processor, a bus connected to the processor, a store connected to the bus for temporarily storing image data, an image data input device connected to the bus for inputting visible images as image data, a communication control connected to the bus means for transmitting and receiving image data to and from a communication line, coders connected to the bus for compressing the inputted image data, a decoder connected to the bus for restoring the received image data to original image data, an image data output device connected to the bus for outputting the restored image data as visible images. The processor is constructed to apply instructions to the store, image data input device, communication control, coders, decoder and image data output device over the bus, and control the image data input device, communication control, coders, decoder and image data output device upon reception of responses from those units, whereby image data inputted by the input device are transmitted. The bus is constructed to cause image data to be transferred between the processor, store, image data input device, communication control, coders, decoder, and image data output device. The coder is constructed to compress image data inputted by the image data input device or image data stored in the store without being compressed, the compressed image data being stored in the store or transferred to the communication control to be transmitted. The decoder is constructed to restore image data which are received by the communication control or image data which are stored in the store without being restored to original image data.

In another aspect of the present invention, there is provided a facsimile communication system in which image data are transmitted based on a transmission time which at the beginning of transmission of image data is sent to a transmitting station as a minimum transmission time which is contained in an initial identification signal for a communication control procedure. The system comprises a store having a capacity large enough to temporarily store a predetermined unit of image data, and a recording device for outputting received image data as visible images. The apparatus at the time of reception of image signals sending to a transmitting apparatus a minimum transmission time which is a time corresponding to an image data writing rate of the store when the store means is not full and corresponding to an image data outputting rate of the recording device when the store is full.

In accordance with the present invention, a high speed, high performance facsimile apparatus having an image data storing function is provided. In the apparatus, coders, decoder and other structural elements are connected to a system bus. Delivery of instructions from a processing unit to the various structural elements in the system return of responses from the structural elements to the processing unit, and exchange of image data between the structural elements are effected over the system bus, so that a single processing unit executes both the control and the input and output of image data.

The above and other objects, features and advantages of the present invention will become more apparent from the following detailed description taken with the accompanying drawings.

BRIEF DESCRIPTION OF THE DRAWINGS

FIGS. 1, 1A and 1B are block diagrams of a facsimile apparatus embodying the present invention; and FIGS. 2 and 3 are flowcharts associated with the embodiment of FIG. 1 and demonstrating a phase 4 control according to the multi-page transmission procedure of the GIII communication system.

DESCRIPTION OF THE PREFERRED EMBODIMENTS

Figure 1B:
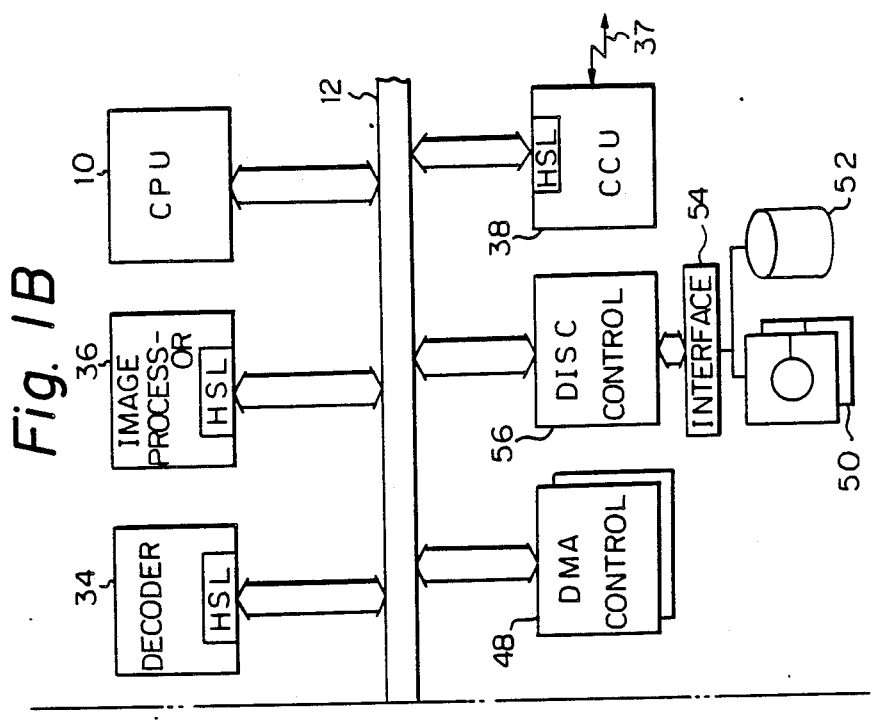

While the facsimile apparatus of the present invention is susceptible of numerous physical embodiments, depending upon the environment and requirements of use, a substantial number of the herein shown and described embodiments have been made, tested and used, and all have performed in an eminently satisfactory manner.

Referring to the drawings, a facsimile apparatus in accordance with the present invention is shown and includes a central processing unit (CPU) 10 having a system bus (CPU bus) 12. An image reader or scanner 18 and an image recorder or plotter 20 are connected to the system bus 12 via handshake logics (HSL) 14 and 16, respectively. As described later in detail, the CPU 10 totally controls the whole apparatus at a high level and may advantageously be implemented with a microprocessor, for example. The system bus 12 includes a data bus, an address bus, and a control bus. The scanner 18 serves to read images on a document and input the image data into the apparatus as bit data and, for this purpose, it includes various systems for reading such as a document feed system, an optical system, an illuminating system, and electrical system. The plotter 20, on the other hand, is an image recording device adapted to produce the image data, or bit data, as a hard copy and fulfills such a function by means of a recording medium feed system, a recording system, etc. Also connected to the system bus is an operating section 22 which interfaces an operator to the apparatus. As shown, the operating section 22 includes a keyboard 24 which is connected to the bus 12 via a keyboard interface 26, and a display 28 which is connected to the bus 12 via a display control 30. Characters to appear on the display 28 are generated in dot patterns by a character generator 31 which is also connected to the system bus 12.

In this particular embodiment, an image data processing section comprises two coding and compressing units (coders) 32A and 32B and an image processor 36 which are also connected to the system bus 12. Each of the coders 32A and 32B removes redundancy from image data and, thereby, compresses them using a plurality of data compression algorithms such as modified Huffman and modified READ coding systems. The decoder 34 functions to decode compressed image data to restore original data and has a plurality of restoration algorithms. Various kinds of image processing such as reduction, enlargement and line density conversion are assigned to the image processor 36. A communication control unit (CCU) 38 is connected to the system bus 12, while an external communication line 39 interconnects a remote receiving apparatus to the CCU 38. The CCU 38 executes communication protocol to the receiving apparatus according to, for example, the GIII standard of CCITT Recommendations, as well as modulation and demodulation.

A DRAM 40, a CMOS RAM 41 and a ROM 42 are connected to the system bus 12 as storages of the apparatus. As described later, the DRAM 40 defines a store area mainly adapted to store visual data such as image data and coded data as well as data stored in a floppy disk 50, which will be described. This particular store area is usable not only as a data buffer between the various units which are connected to the system bus 12, but also as an area for storing and transferring (SAF) visual data. Further, a part of the same area is used as FIFO adapted for interunit transfer rate adjustment. The CMOS RAM 41 stores supervisory data associated with the system and, in this particular embodiment, backed up by a battery or like spare power source. A control program which the CPU 10 is to run and various fixed data are stored in the ROM 42. A clock 44 is connected to the system bus 12 and comprised of a calender clock unit adapted for the management of time and date. The information output from the clock 44 is transferred from the display control 30 in the operating section 22 to the display 28 to be displayed. Such information may be superposed on visual information as desired after being transformed into dot patterns by the character generator 31. An interruption control 46 is connected to the system bus 12 in order to control various kins of interruption to the CPU 10.

The apparatus of the present invention is capable of allowing the various units to exchange data directly at a high-speed over the system bus 12. Such direct memory addressing (DMA) is effected by a DMA control 48. The previously mentioned floppy disk 50 and a fixed disk 52 constitute a file memory device in the illustrative system. The disks 50 and 52 are connected to the system bus 12 via an interface 54 and a disk control 56 and used to store visual data, for example.

During tansmit mode operation, image data read by the scanner 18 are directly transferred to the DRAM 40 of the apparatus controlled by the DMA control 48, that is, without the intermediary of the CPU 10. In the DRAM 40, the image data are stored in the SAF area. The data stored in the DRAM 40 are transferred to the coders 32A and 32B, again controlled by the DMA control 48. The coders 32A and 32B compress the input data by removing redundancy from them using a predetermined algorithm. The coded data output from the coders 32A and 32B are returned to the DRAM 40 under the control of the DMA control 48 to be temporarily stored in the FIFO area of the DRAM 40.

Assume that the clock 44 which supervises the time of the system has reached a time which may have been preset in the CPU 10. Then, the CCU 38 sets up connection of the apparatus to a receiving apparatus over the line 39 under the control of the CPU 10. Thereafter, the DMA control 48 reads the compressed data out of the FIFO area of the DRAM 40 on a first-in-first-out (FIFO) basis while feeding them to the CCU 38. This FIFO area functions to match the processing rates of the coder 32A or 32B and the CCU 38. The CCU 38, independently of the procedure described so far, interconnects the apparatus to the receiving apparatus over the line 39 controlled by the CPU 10. Then, the coded data output from the DRAM 40 are modulated by the CCU 38 to be delivered to the line 39. In this manner, in a transmit mode operation the image data are rapidly transferred over the system bus 12 chiefly controlled by the DMA control 48. It will be seen that the coder 32A or 32B bifunctions to code those image data which are to be transmitted over the line 39 and those which are to be stored in the DRAM 40 and floppy disk 50.

Meanwhile, the CPU 10 executes total controls over the whole system such as applying a read command to the scanner 18, a write command to the plotter 20 and other high-level commands and receiving and processing responses to those commands, instructing the coders 32A and 32B to start and stop coding operation, supervising data stored in the DRAM 40, controlling the DMA control 48, and instructing the CCU 38 to start and stop the communication procedure.

Now, even through protocol may be set up between the transmitting and receiving stations by the CCU 38, transmission of image data will be disabled if the transmitting station differs from the receiving station in any one of the compression system for compressing image data stored in the DRAM 40, the line density, and the document size. Then, it is necessary for the transmitting station to match itself to the receiving station by removing the difference. In accordance with the present invention, such a requirement is met by the following procedure.

First, the image data are read out of the DRAM 40 and transferred to the decoder 34 and, then, stored in the DRAM 40 again. Thereafter, the decoded data are read out of the DRAM 40 to be compressed by the coder 32A or 32B in a specific manner which matches with the conditions of the receiving station. The coded data are returned to the DRAM 40 again. Finally, the coded data in the DRAM 40 are sent out to the line 39 by the CCU 38. Naturally, such data transfer between the various units occurs at a high speed under the control of the DMA control 48. Further, the DRAM 40 is used for multiple purposes as a buffer memory adapted to match the data transfer rates of the decoder 34 and the coder 32A or 32B and to match those of the coder 32A or 32B and the CCU 38.

During a receive mode operation, first the CCU 38 responds to a signal coming in over the line 39 by informing the CPU 10 of the reception of data. Then, the CPU 38 proceeds with communication control according to a predetermined reception control procedure. The received image data, although in a compressed format, are applied to the FIFO area of the DRAM 40 to be temporarily stored therein under the control of the DMA control 48. Thereafter, the image data are read out of the DRAM 40 to be delivered to the decoder 34. The image data decoded by the decoder 34 are returned to the DRAM 40 controlled by the DMA control 48 and, then, read thereoutof by the DMA control 48 to be produced as a hard copy by the plotter 20. In this manner, the decoder 34 serves not only to reproduce image data which are received over the line 39 but also to decode image data which are to be written into the DRAM 40. It is to be noted that the image data stored in the DRAM 40 are held therein at least until that the plotter 20 has properly produced a hard copy is confirmed.

As described above, during a receive mode operation image data are stored in the DRAM 40. In parallel with such an operation, image data on a document are read by the scanner 18 and stored in the DRAM 40 and, at this instant, compression by the coders 32A and 32B and storage of compressed data into the DRAM 40 can be performed by simultaneous processing. Another capability of the apparatus is that while image data stored in the DRAM 40 are transmitted with the line density changed, other image data may be read by the scanner 18 and written into the DRAM 40. In such a case, one of the coders such as the coder 32A will compress image data for transmission (here, line density conversion), and the other coder 32B will compress new image data to be stored in the DRAM 40.

An arrangement may be made such that while image data are read by the scanner 20, they are compressed by the coder 32A, then the compressed data are fed to the DRAM 40 and, at the same time, to the decoder 34 to be inverted to non-compressed data, and then the non-compressed data are compressed again by the coder 32B based on a compression system which matches with the conditions of the receiving station. An arrangement may also be made such that when the line density and document size associated with the so compressed and stored image data have been decided to differ from those of the receiving station, the decoder 34 processes the coded data back to the non-compressed data and, then, the image processor 36 converts the line density and document size again. Conversely, in a system having a plurality of decoders, an arrangement may be made such that one of the decoders restores image data coming in through the line 39 to original image data, while the other restores coded data stored in the DRAM 40 to non-compressed data and a coder compresses the non-compressed data using a compression system which matches with particular conditions of a receiving station.

Conversion of image data as described above enables image data stored in the DRAM 40 to be transmitted with the line density of image data, the document size and the compression system matched to those of a receiving station. The reconversion of the line density and document size are effected by decoding compressed image data stored in the DRAM 40 by means of the decoder 34 and, then, applying the decoded image to the image processor 36.

However, as appreciated from the above, the possibility of image data being repeatedly transferred over the system bus 12 is increased, reducing the throughput of the whole system. From the utilization standpoint, therefore, image data to be stored in the DRAM 40 should advantageously be conditioned to match with the functions of the other party as far as possible. In this particular embodiment, such is implemented with the CMOS RAM 41 which is capable of storing information particular to a receiving subscriber, i.e. data representative of performance specific to a subscriber's facsimile apparatus. As previously stated, the CMOS RAM 41 is backed up by a battery or like spare power source to preserve the stored data for a long time. As the operator enters a subscriber's number on the operating section 22 with the intention of transmitting image data to a desired remote subscriber, the CMOS RAM 41 stores it. When the coders 32A and 32B and image processor 36 compress image data read by the scanner 18, they are supplied with information specific to the subscriber which are read out of the CMOS RAM 41 controlled by the CPU 10 so that the image data are compressed under particular conditions matching with the performance of the remote subscriber's apparatus, e.g. compression system, document size and line density. The so compressed image data are stored in the data buffer area of the DRAM 40 under the control of the DMA control 48, as previously mentioned.

As described above, image data read by the scanner 18 are compressed in conformity to functional conditions which are specific to a receiving station in order to reduce as far as possible the probability of occurrence that image data need to be reconverted before delivered to the line 39. Consequently, the chance for image data to be transferred over the system bus 12 is decreased, enhancing the data processing throughout of the overall system accordingly. For example, DMA controller HD69450 (Hitach Ltd.) which is a peripheral of micro-CPU 6800 (Motorola) is capable of transferring data at the rate of 4 megabytes per second. Where a document of a format A4 is scanned at the line density of 8 lines per millimeter, the total number of bits in the main scanning direction is 216 bytes. In a system having an input output rate of 5 milliseconds per line, a transfer rate of 43.2 kilobytes are necessary for one line of data to be transferred. Since this transfer rate is approximately ninety-two times the transfer capacity of the above-mentioned DMA controller, the use of such a controller enables data transfer to occur ninety-two consecutive times. Hence, the transfer in the illustrative embodiment which only needs to occur less than ten times can be realized leaving a sufficient margin in the micor-CPU transfer.

Generally, it is advantageous from economy standpoint that in storage and transmission (SAF) of image data the data be compressed at the time of storage as well. Heretofore, such storage of image data has been implemented using an exclusive compression and restoration unit. In contrast, in this particular embodiment, the coders 32A and 32B, decoder 34 and others are connected to the system bus 12 to replace the exclusive compression and restoration unit. That is, a single compressing unit is usable for both of compression for transmission and that for storage. Such not only simplifies the construction but also efficiently copes with any difference in the parameters of compressed data between the transmitting and receiving stations.

As previously described, the apparatus of the present invention is capable of storing image data read by the scanner 18 even during a receive mode operation, remarkably improving operationability in half-duplex facsimile communications. This particular function is impracticable with prior art systems or, if practicable, would require an expensive system which relies on an intricate construction and overlapping functions. This particular embodiment of the present invention realizes such multiple functions by means of a simple construction.

Now, in this particular embodiment, the CCU 38 executes a communication control procedure according to a facsimile communication system as prescribed by CCITT Recommendations, e.g. GIII. Assume that the illustrated apparatus is a receiving station which receives data from a remote transmitting station. Upon reception of a signal coming in through the line 39, the receiving station sequentially proceeds with phases 1–5. As well known in the art, the receiving station at the beginning of phase 2 sends a signal DIS or a non-standard facilities signal NSF back to the transmitting station in order to inform the latter of various functions specific to itself. The twenty-first to twenty-third bits of the signal DIS are indicative of the minimum transmission time per scanning line. In a prior art facsimile apparatus, it has been customary to return A signal DIS by setting in those specific bits an allowable reception rate as is determined by a recording time per scanning line particular to a recorder of the apparatus; a transmitting apparatus selects a particular mode matching with the own station's conditions based on the returned functional conditions, then sets it in a digital command signal DCS, and then sends it to the receiving station.

In the illustrative embodiment, where the apparatus serves as a receiving station and if the buffer area of the DRAM 40 assigned to received image data is not full, not the recording rate of the plotter 20 but the writing rate of the DRAM 40 is set in the twenty-first to twenty-third bits of the signal DIS as the previously mentioned reception rate. The twenty-first to twenty-third bits are denoted in milliseconds and the storing rate of the memory concerned is usually far higher than the image signal transmission rate, so that in this case the twenty-first to twenty-third bits are set to zero millisecond. Upon reception of the signal DIS, the transmitting station selects a particular mode matching with the own conditions based on the functional conditions which are contained in the signal DIS, and then transmits a digital command signal DIS to the receiving station setting the selected mode in the signal. At the transmitting station, since the image data read by the scanner 18 are temporarily stored in the DRAM 40, image data can be transmitted with the minimum transmission time per scanning line set to zero millisecond so long as they are read out of the DRAM 40.

It is not contradictory that even when image data read by the scanner 18 are directly applied to the line 39, transmission is effected with the minimum transmission time of zero millisecond. Fill bits may be inserted in compressed image data on a one scanning line basis in order to match the transmitting data rate to the inputting rate of the scanner 18. Further, where the delivery rate to the line 39 is higher than the compressed data generation rate, the store area of the DRAM 40 is apt to become empty while the compressed data are read out of the DRAM 40 to be transferred to the CCU 38. In such a condition, fill bits may be inserted in the image data to be transmitted by the CCU 38.

Referring to FIGS. 2 and 3, there are shown controls in accordance with the illustrative embodiment in phase 4 (end-of-message-transmission confirmation procedure) which is based on the GIII multi-page transmission procedure.

The controls shown in FIGS. 2 and 3 are executed at a transmitting or receiving station mainly by the CCU 38 under the control of the CPU 10. At a transmitting station, as messages in one page of document are fully transmitted to a receiving station in phase 4, a multi-page signal MPS is sent to the receiving station as a postcommand message and, then, the operation returns to phase 2 (200). At the receiving station, as a signal MPS, an end-of-procedure signal EOP and an end-of-message signal EOM are received during multi-page reception mode (100), if storage of data into the DRAM 40 is under way (102), whether the DRAM 40 will have a sufficient empty space in its store area when image data in the next page and onward are received (104). If such an empty space is available, the operation returns to the usual phase 2 (procedure after the setup of a call and before the transmission of a message). If the empty space is not available, whether a hard copy produced by the plotter 20 has acceptable quality is determined (106).

Thereafter, in this particular embodiment, a mode change request signal MCR is transmitted from the receiving station to the transmitting station as a post-message response signal, thereby requesting the former to change the mode. At this instant, if the quality of the hard copy produced by the plotter 20 is acceptable, the receiving station sends to the transmitting station a mode change request positive signal MCR-P and, if not, then a mode change request negative signal MCR-N (112). Then, the control at the receiving station returns to phase 2. Here, an actual output rate at which the plotter 20 produces image signals as a hard copy is selected to be the minimum transmission time which is to be contained in the signal DCS to be sent from the receiving station to the transmitting station as a response of an initial identification signal DIS in phase 2.

Meanwhile, as shown in FIG. 3, the transmitting station which has sent the signal MPS (200) decides whether the received data contains a message confirmation signal MCF, a reception failure retrain request signal RTN or the like (202). If none of them is contained, then whether a signal MCR-P or MCR-N is contained is determined (204). If none of them is contained, a disconnect command signal DCN is transmitted (206) to disconnect the line (208). If the signal MCR-P or MCR-N is contained, the operation returns to phase 2. That is, the transmitting station receives another initial identification signal to see the minimum transmission time of the receiving station again. Based on the result, the transmitting station sets up an image data transmission rate. Specifically, the transmitting station sees that the DRAM 40 at the receiving station is full and, therefore, matches its transmission rate to the hard copy output rate of the recorder of the receiving station. Such prevents the data buffer area of the DRAM 40 of the receiving station from overflowing and allows the recroder to sequentially record image data while gradually increasing the empty space. As the empty store area increases in the DRAM 40 of the receiving station, the control at the receiving station returns to phase 2 at a control step 104. At phase 2, zero millisecond is set again in the signal DIS and sent back to the transmitting station so that transmission of image data can be resumed at the writing rate of the DRAM 40.

As described above, in this particular embodiment, a receiving station has the DRAM 40 capable of storing a large amount of image data and, so long as the DRAM 40 is not full, not the outputting rate of the plotter 20 but the writing rate of the DRAM 40 is transmitted to the transmitting station to cause the latter to send out image data at the writing rate. It follows that even if the outputting rate of the plotter 20 is lower than the image data transmission rate, image data can be transmitted rapidly to increase the transmission efficiency of the whole system.

Generally, while a recorder having a high output rate is complicated and expensive, the semiconductor technology now under rapid progress is ready to yield a semiconductor memory having a greater capacity such as the order of 1 megabits at a lower cost. Using such a large capacity semiconductor memory, it is possible to construct a facsimile apparatus which is simple in construction and small in size as a whole system and, despite the use of a low-speed image data recorder, achieves a transmission rate which is equivalently comparable with or even higher than that of an apparatus of the type using a high-speed recorder. In addition, a memory adapted for storing and forwarding (SAF) image data, i.e. DRAM 40 in the illustrative embodiment, is constantly utilized with efficiency.

In summary, a facsimile apparatus in accordance with the present invention has various advantages as enumerated below.

(1) A single processing unit suffices for both the control and the input and output of image data because the delivery of instructions from the processing unit to various structural elements in the system, return of responses from the structural elements to the processing unit, and exchange of image data between the structural elements are performed through a system bus. The system, therefore, features unprecedented flexibility in application and the apparatus is small in size and high in speed and performance.

(2) Since coders, a decoder and other structural elements are connected to the system bus, they are usable not only for transmission purpose but also for storage purpose. This also enhances a small-size, high-speed and high-performance apparatus design.

(3) So long as an image data store at a receiving station is not full, image data can be transmitted to the receiving station at a writing rate of the store so that the image transmission time is shortened.

Various modifications will become possible for those skilled in the art after receiving the teachings of the present disclosure without departing from the scope thereof.

What is claimed is:

1. A facsimile apparatus comprising:
processor means;
bus means;
store means connected to said bus means for temporarily storing image data;
image data input means connected to the bus means for inputting visible images as image data;
coder means connected to the bus means for compressing the inputted image data;
decoder means connected to the bus means for restoring the received image data to original image data;
communication control means connected to the bus means for transmitting and receiving image data to and from a communication line;
image data output means connected to the bus means for outputting the restored image data as visible images; and
sensing means coupled to said communication control means for sending in a compressed form if a receiving station can accept said image data in a compressed form in response to said sensed ability of said received station to accept data in compressed form and transmitting said image data in a non-compressed form responsive to a sensed inability of said received station to receive data in a compressed form;
wherein the processor means applies instructions to the store means, the image data input means, the communication control means, the coder means, the decoder means and the image data output means over the bus means, and controls the image data input means, the communication control means, the coder means, the decoder means and the image data output means upon reception of responses from said means, whereby image data inputted by the input means are transmitted to the communication line as compressed image data, while image data received over the communication line are outputted by the output means; and further wherein
said bus means causes image data to be transferred between the processor means, the store means, the image data input means, the communication control means, the coder means, the decoder means, and the image data output means;
transmission means for transmitting image data based on a transmission time, which at the beginning of transmission of image data is sent to a transmitting station as a minimum transmission time which is contained in an initial identification signal for a communication control procedure;
recording means for outputting received image data as visible images;
means for said apparatus, at the time of reception of image signals to send to a transmitting apparatus a minimum transmission time, which is a time corresponding to an image data writing rate of said store means when said store means is not full and corresponding to an image data outputting rate of the recording means when the store means is full.

2. A facsimile apparatus as claimed in claim 1, wherein the processor means is constructed to apply instructions to the store means, the image data input means, the communication control means, the coder means, the decoder means and the image data output means over the bus means, and control the image data input means, the communication control means, the coder means, the decoder means and the image data output means upon reception of responses from said means, whereby image data inputted by the input means are transmitted to the communication line as coded image data, while image data received over the communication line are outputted by the output means.

3. A facsimile apparatus as claimed in claim 2, wherein the bus means is constructed to cause image data to be transferred between the processor means, the store means, the image data input means, the communication control means, the coder means, the decoder means, and the image data output means.

4. A facsimile apparatus as claimed in claim 3, wherein the coder means is constructed to compress image data inputted by the image data input means or image data stored in the store means without being compressed, said compressed image data being stored in the store means or transferred to the communication control means to be transmitted.

5. A facsimile apparatus as claimed in claim 4, wherein the decoder means is constructed to restore image data which are received by the communication control means or image data which are stored in the store means without being restored to original image data.

6. A facsimile apparatus as claimed in claim 1, wherein the coder means is constructed to compress image data inputted by the image data input means or image data stored in the store means without being compressed, said compressed image data being stored in the store means or transferred to the communication control means to be transmitted.

7. A facsimile apparatus as claimed in claim 6, wherein the decoder means is constructed to restore image data which are received by the communication control means or image data which are stored in the store means without being restored to original image data.

8. A facsimile apparatus as claimed in claim 1, wherein the processor means is constructed to apply instructions to the store means, the image data input means, the communication control means, the coder means, the decoder means and the image data output means over the bus means, and control the image data input means, the communication control means, the coder means, the decoder means and the image data output means upon reception of responses from said means, whereby image data inputted by the input means are transmitted to the communication line as compressed image data, while image data received over the communication line are outputted by the output means.

9. A facsimile apparatus as claimed in claim 8, wherein the bus means is constructed to cause image data to be transferred between the processor means, the store means, the image data input means, the communication control means, the coder means, the decoder means, and the image data output means.

* * * * *